Jan. 2, 1923.
P. P. ALEXANDER.
ARC WELDING APPARATUS.
FILED JULY 26, 1921.
1,440,711.
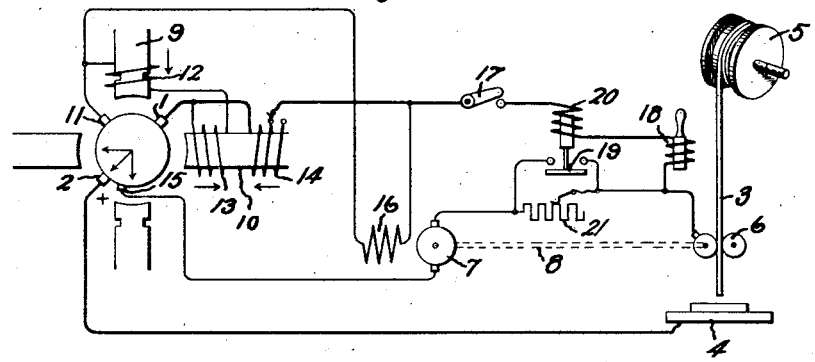
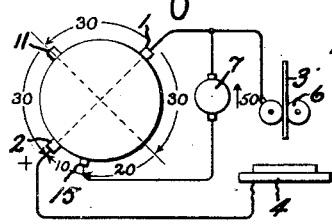 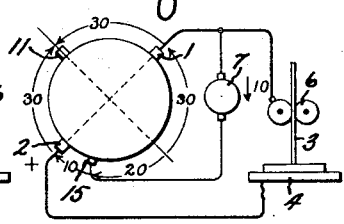 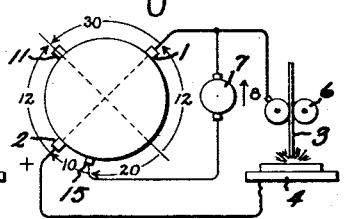
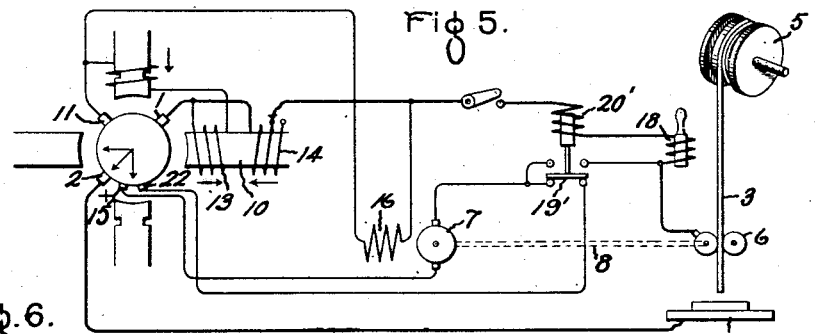
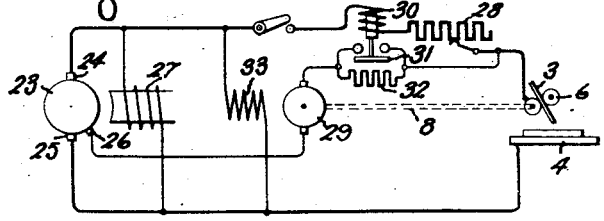
Inventor:
Peter P. Alexander,
by Albert G. Davis
His Attorney.

UNITED STATES PATENT OFFICE.

PETER P. ALEXANDER, OF LYNN, MASSACHUSETTS, ASSIGNOR TO GENERAL ELECTRIC COMPANY, A CORPORATION OF NEW YORK.

ARC-WELDING APPARATUS.

Application filed July 26, 1921. Serial No. 487,608.

*To all whom it may concern:*

Be it known that I, PETER P. ALEXANDER, a citizen of Russia, residing at Lynn, in the county of Essex, State of Massachusetts, have invented certain new and useful Improvements in Arc-Welding Apparatus, of which the following is a specification.

My invention relates to electric arc welding and more particularly to apparatus for arc welding of the automatic or semi-automatic type in which a metallic electrode is automatically fed to the work and the rate of feeding controlled in accordance with the voltage at the arc to maintain the arc length constant.

An object of my invention is to provide an apparatus and control system which shall consist of but few parts ruggedly constructed and simply connected, arranged so that reliable and satisfactory operation may be secured without the attention of skilled electricians.

My invention will be better understood from the following description taken in connection with the accompanying drawing, and its scope will be pointed out in the appended claims.

In the accompanying drawing, Fig. 1 is a diagrammatic representation of an apparatus and control system arranged according to my invention; Figs. 2, 3 and 4 are diagrammatic representations showing the operation of the system of Fig. 1 during different phases of operation; Fig. 5 is a diagrammatic representation of a modified form of control system; and Fig. 6 is a diagrammatic representation of a further modification of the system showing its application to constant voltage generators.

In Fig. 1 the generator is represented as having main brushes 1 and 2 connected respectively to the electrode 3 and the work 4. The electrode 3 is represented as fed from a reel 5 by electrode feeding mechanism comprising rolls 6 driven from the motor 7 which is geared in any suitable manner to the rolls 6, such gearing being diagrammatically represented by the dotted shaft 8. The generator shown in Fig. 1 is of the type shown in the patent to Bergman, No. 1,340,004, patented May 11, 1920. This generator is an inherently regulated generator which supplies current to the welding circuit which current varies inversely with the voltage so that throughout the range of voltages customarily used for arc welding, the energy supplied to the welding circuit is maintained approximately constant. This generator is a constant speed machine, one pair of poles 9 of which are arranged to be saturated and the other pair of poles 10 of which are unsaturated during the normal operation of the machine. In addition to the main brushes, the armature is provided with a third brush 11. The arrangement is such that the voltage between brushes 1 and 11 is produced by the saturated poles 9 only, while the voltage between brushes 1 and 2 which are connected to the welding circuit is produced by the flux in both the saturated and unsaturated poles. Since the generator is a constant speed machine, it is apparent that the voltage between brushes 1 and 11 is substantially constant. Exciting windings 12 and 13 supplied from the constant voltage brushes 1 and 11 are arranged upon the field poles 9 and 10 respectively and the direction of winding is such that the magnetomotive force of these windings tends to produce fluxes and electromotive forces in the same direction between brushes 1 and 2. An adjustable differential series winding 14 carrying welding current is arranged upon poles 10. The armature reaction of the generator is arranged so that the component thereof in line with the poles 10 assists the winding 14 and so that the component thereof in line with the poles 9 assists the winding 12. It is apparent that variations in the welding current have little effect upon the fluxes in the line of poles 9 as thus arranged since these poles are saturated. It is apparent, moreover, that variations in the welding current have a marked effect upon the fluxes in the line of poles 10 since these poles are always unsaturated. The windings are preferably so arranged that with no current flowing in the welding circuit the voltage at the brushes 1 and 2 will be that necessary for striking the arc, and so that at a certain value of load current, preferably about one-half load, the resultant flux in the poles 10 is zero. At such a load the voltage between the brushes 1 and 2 is equal to the voltage between the brushes 1 and 11. When the welding current increases above the value the flux in poles 10 builds up in the opposite direction so that the voltage between brushes 2 and 11 increases but with opposed polarity to that between brushes 1 and 11. Therefore, the voltage between brushes 1 and 2 is equal to the voltage between brushes 1 and 11 less the voltage between brushes 2 and 11. When the welding circuit is short circuited, the voltage between brushes 2 and 11 is substantially equal to the voltage between brushes 1 and 11 and opposed thereto. It is thus seen that the voltage between the welding circuit brushes 1 and 2 is the algebraic sum of the voltages between the brushes 1 and 11 and between the brushes 2 and 11, while the voltage between brushes 1 and 11 is at all times substantially constant. In addition to the main and third brushes, I provide the generator with an auxiliary brush 15 spaced from the brush 2 connected to one side of the welding circuit so that the voltage between brushes 2 and 15 is several volts lower than the arc voltage during welding. The auxiliary brush 15 is located so that the voltage between the brushes 2 and 15 is produced by the saturated poles 9, whereby this voltage remains substantially constant. One terminal of the armature of the electrode feed motor 7 is connected to the auxiliary brush 15, while the other terminal of the armature is connected to the side of the welding circuit which feeds current to the welding electrode 3. The field winding 16 of the electrode feed motor is connected to be supplied from the constant voltage brushes 1 and 11 of the generator. Any suitable main line switch indicated at 17 may be used to control the welding circuit. A reactance 18 will preferably be used to stabilize the welding current in a manner well known in the art.

As will appear more clearly hereinafter in connection with the description of the operation of the system, the voltage impressed upon the armature of the electrode feed motor 7 will be abnormally high whenever the welding arc goes out and it is, therefore, desirable to provide means which will prevent more than a predetermined current from flowing through the armature of the feed motor when the arc voltage exceeds a predetermined maximum. A convenient means for securing this result comprises a circuit controlling means 19 controlled by a coil 20 in series relation with the welding circuit. As shown in Fig. 1, this circuit controlling means is arranged to short circuit an adjustable resistor 21 in the circuit of the armature of the feed motor whenever welding current flows and to insert this resistance when there is no current flowing in the welding circuit.

The operation of the system shown in Fig. 1 will now be described in connection with Figs. 2, 3 and 4, which show the operation of the system during various phases of operation. It is assumed that the generator is arranged to give 60 volts on open circuit. Fig. 2 shows this condition in which the welding electrode 3 is separated from the work 4. In this phase of operation the voltage between brushes 2 and 11 is 30 volts and assists the voltage between brushes 1 and 11 to produce the open circuit voltage. The auxiliary brush 15 is represented as located so that the voltage between this brush and the main brush 2 is 10 volts. It will be understood that the brush 15 will be made adjustable about the commutator by any means well known in the art so that the voltage between the brushes 2 and 15 may be adjusted to any desired value. It will be observed from Fig. 2 that the generator impresses 50 volts upon the armature of the feed motor 7 and the arrow adjacent this armature indicates the direction of current through the armature. The armature will now operate the electrode feeding mechanism 6 to feed the electrode 3 toward the work. As soon as the electrode touches the work, the condition represented in Fig. 3 will obtain. It will be observed from this figure that the voltage between brushes 2 and 11 is now 30 volts in the opposite direction to the direction obtaining in Fig. 2 so that the main brushes 1 and 2 deliver no voltage to the welding circuit. It will also be observed that 10 volts is now impressed upon the armature of the electrode feed motor in the opposite direction to the voltage impressed upon the feed motor in the phase of operation shown in Fig. 2, hence the feed motor operates in a direction to withdraw the electrode 3 from the work and strike the arc. As the electrode is withdrawn from the work, the voltage between brushes 2 and 11 decreases and, when normal welding voltage is reached, for example 18 volts, the voltage between brushes 2 and 11 will be 12 volts and 8 volts will be impressed upon the armature 7 in the same direction that the voltage was impressed during open circuit condition shown in Fig. 2, namely, in a direction to operate the feed motor to feed the electrode toward the work to maintain the welding arc. The motor will operate at such a speed as is necessary to maintain the arc at constant length. The operation will be quite sensitive for the reason that any variation in the voltage of the arc corresponding to a variation in an arc length will produce a greater percentage in the variation of the voltage impressed upon the armature of the feed motor. For example, if the arc voltage should increase two volts or 11.1 per cent, the variation in the voltage applied to the armature of the feed motor would be 25 per cent. If at any time the arc voltage should fall below 10 volts the current through the armature of the feed motor would reverse the motor and the motor would tend to operate in a direction to withdraw the electrode from the work. The apparatus will, therefore, operate to restrike the arc if it should at any time become short-circuited by the electrode touching the work.

It will be observed from the preceding paragraph that during the phase of the operation represented in Fig. 2, 50 volts are impressed upon the armature of feed motor 7. Since during normal operation this motor is designed to operate with an impressed voltage in the neighborhood of 10 volts, this abnormally high voltage would not only tend to damage the motor but would cause the motor to operate at such a high speed that it would feed the electrode 3 toward the work so rapidly as to render difficult the operation of striking the arc. I therefore provide the electro-responsive means comprising the coil 20 which, when there is no current in the welding circuit, allows the circuit-controlling means 19 to insert the resistor 21 in the circuit of the armature of the feed motor 7. This resistor limits the current through the motor armature to a predetermined value, and by suitable adjustment of the resistor 21 the motor may be arranged to feed the electrode toward the work at any desired speed. As soon as the electrode 3 touches the work 4, current begins to flow in the welding circuit and the coil 20 moves the circuit-controlling means 19 to short circuit the resistor 21 and connect the armature of the feed motor 7 directly between the side of the welding circuit to which the electrode 3 is connected and the auxiliary brush 15 of the generator so that the feed motor now operates in response to the difference between the arc voltage and the voltage between the auxiliary brush 15 and the main brush 2, as heretofore set forth.

It will be obvious that my invention is not only applicable to completely automatic machines in which means are provided for relatively moving the work and electrode to cause the welding arc to follow the seam to be welded, as is well known in the art, but to semi-automatic machines in which the traversing motion is produced manually.

Fig. 5 shows a modification of my invention utilizing a different arrangement of parts for limiting the current of the armature through the feed motor during the phase of operation when an abnormally high voltage exists in the welding circuit. In this figure the generator is provided with main, third and auxiliary brushes 1, 2, 11 and 15, exactly as in the system of Fig. 1, and the construction of the generator and connections thereof to the welding circuit are the same as in Fig. 1. The generator is, however, provided with a second auxiliary brush 22 so placed that the voltage between brushes 22 and 15 is substantially constant, the brush 22 being placed at a point of higher potential on the commutator of the generator than the point to which the brush 15 is adjusted. The coil 20' of the circuit-controlling means 19' is connected in the welding circuit like the coil 20 shown in Fig. 1. When current flows in the welding circuit the coil 20' moves the circuit-controlling means 19' to its upper position to connect the armature of the feed motor 7 between one side of the welding circuit and the brush 15 precisely as in the arrangement shown in Fig. 1. When there is no current in the welding circuit, the circuit-controlling means 19 moves to its lower position to connect the armature of the feed motor 7 between the auxiliary brushes 22 and 15 so that a voltage corresponding to the distance between brushes 22 and 15 is impressed upon the armature of the feed motor to operate the same in the direction to feed the electrode toward the work. When the electrode touches the work current flows through the welding circuit to re-connect one terminal of the armature of the feed motor to one side of the welding circuit so that the motor will thereafter operate to strike the arc and maintain the arc at constant length as shown in the arrangement of Fig. 1.

I do not claim broadly the idea of controlling an electrode feed motor in accordance with the difference between the arc voltage and a voltage less than the arc voltage, said subject matter being claimed in the application of Max A. Whiting, Serial No. 277,309, filed February 15, 1919, for Methods and Apparatus for Automatic Arc Welding, which application is assigned to the assignee of my present application.

Fig. 6 shows the application of my invention to a welding system in which the welding current is provided from an ordinary constant voltage generator without inherent regulation to control the welding current. In this figure the generator 23 is provided with the main brushes 24 and 25 connected to the welding circuit and an auxiliary brush 26 located adjacent the brush 25 so that the voltage between brushes 25 and 26 is substantially constant and of any desired value lower than the normal arc voltage depending upon the position to which the brush 26 is adjusted around the commutator of the generator. The generator is represented as provided with an ordinary shunt field winding 27. The welding electrode 3 is represented as connected to one side of the generator through an adjustable resistor 28 which regulates the welding current so that the current in the welding circuit is limited during short circuit and so that during normal operation any increase in the welding current is accompanied by a decrease in the voltage across the arc, this result being caused by the increased potential drop in the resistor 28 as is well known in the art of electric arc welding. The armature of the field motor 29 has one terminal connected to the auxiliary brush 26. A coil 30 in series relation with the welding circuit is arranged to control a contact 31 which when the coil 30 is energized by current in the welding circuit connects the other terminal of the field motor 29 to a point in the welding circuit having the same potential as the electrode 3. When there is no current in the welding circuit the contact 31 causes the resistor 32 in the circuit of the armature of the feed motor 29 to limit the current therethrough in the same manner as the current is limited in the arrangement shown in Fig. 1. The field winding 33 of the feed motor is represented as connected across the terminals of the generator so that the voltage impressed thereon is substantially constant.

The operation of the arrangement shown in Fig. 6 will be obvious from the preceding description given in connection with the operation of the arrangement shown in Fig. 1. When the welding circuit is open, there is no drop in the resistor 28 and consequently the full voltage of the generator would be applied to the feed motor 29 if it were not for the electro-responsive device which operates to insert the resistor 32 during this phase of operation. The feed motor now operates slowly to feed the electrode 3 toward the work and when the electrode touches the work the contact 31 is operated to short circuit the resistor 32. The full voltage between brushes 26 and 23 is now impressed upon the armature of the feed motor 29 to operate the feed motor in a direction to withdraw the electrode from the work and strike the arc. As soon as the arc voltage exceeds the voltage between brushes 26 and 25, voltage is applied to the armature of the feed motor in the reverse direction to operate the feed motor to feed the electrode toward the work and to maintain the arc length constant.

While I have shown and described but few modifications of my invention, it will be obvious to those skilled in the art that further modifications are possible, and I therefore aim in the appended claims to cover all such changes and variations as fall within the spirit of my invention.

What I claim as new and desire to secure by Letters Patent of the United States, is:

1. In a system for electric arc welding, the combination of a generator having a pair of main brushes and an auxiliary brush between which and one of the main brushes the voltage is substantially constant, a welding circuit connected to be supplied from said main brushes, electrode feeding mechanism, a motor for operating said feeding mechanism, and means for connecting said motor to said auxiliary brush and welding circuit so that the direction and speed of operation of the motor is controlled in accordance with the difference between the arc voltage and said constant voltage.

2. In a system for electric arc welding, the combination of a generator having a pair of main brushes and an auxiliary brush, a welding circuit comprising a pair of mains connected to said main brushes, one of which mains is adapted to supply current to a welding electrode and the other of which is adapted to be connected to the work, electrode feeding mechanism, and a motor for operating said feeding mechanism having its armature connected between said welding electrode main and said auxiliary brush.

3. In a system for electric arc welding, the combination of a welding circuit, a generator having brushes adapted to supply current to said welding circuit, electrode feeding mechanism, a motor for operating said feeding mechanism and means for connecting one terminal of the armature of said motor to one side of the welding circuit and the other terminal to a point on the armature of said generator the potential of which lies between the potentials of said brushes so that the direction and speed of operation of the motor is controlled in accordance with the difference between the voltage across the arc and a voltage which is a fraction of the open circuit voltage of the generator.

4. In a system for electric arc welding, the combination of a welding circuit adapted to be connected to a welding electrode and the work, a generator having main brushes adapted to supply current to said welding circuit and an auxiliary brush between which and one of the main brushes the voltage is substantially constant, electrode feeding mechanism, a motor for operating said feeding mechanism connected between one side of the welding circuit and said auxiliary brush, said auxiliary brush being located adjacent to and spaced from the main brush connected to the other side of the welding circuit so that with normal arc voltage a voltage is impressed upon the motor to operate the electrode feeding mechanism in a direction to feed the electrode toward the work to maintain the arc length constant and so that when the arc voltage falls below the voltage between said main and auxiliary brushes a voltage is impressed upon the motor to operate the electrode feeding mechanism in a direction to feed the electrode away from the work.

5. In an apparatus for electric arc welding, wherein a welding circuit comprising a welding electrode and the work is supplied from a generator having main brushes adapted to supply a current which varies inversely with the arc voltage and having a third brush between which and one of the main brushes a substantially constant voltage is maintained, and wherein a motor is arranged to operate electrode feeding mechanism to maintain the arc at constant length, characterized by the fact that the field circuit of the motor is connected to be supplied from said main and third brushes at constant voltage and the armature circuit connected between the welding electrode and an auxiliary brush on the generator whose potential is substantially constant and several volts lower than the potential of the welding electrode during normal operation.

6. An arc welding system comprising a generator having main brushes and an auxiliary brush between which and one of the main brushes the voltage is substantially constant and lower than the arc voltage during welding, a welding circuit connected to said main brushes, electrode feeding mechanism, a motor for operating said feeding mechanism, a circuit connecting said motor between one side of the welding circuit and said auxiliary brush so that the operation of the motor is controlled by the difference between the arc voltage and the voltage between said main and auxiliary brushes, and means responsive to the electrical condition of the arc arranged to control the circuit of the motor to prevent current above a predetermined amount from passing through the motor armature when the potential across the arc reaches a predetermined value.

7. An arc welding system comprising a generator having main brushes and an auxiliary brush between which and one of the main brushes the voltage is substantially constant and lower than the arc voltage during welding, a welding circuit connected to said main brushes, electrode feeding mechanism, a motor for operating said feeding mechanism, a circuit for connecting the armature of said motor between one side of the welding circuit and said auxiliary brush so that the operation of the motor is controlled by the difference between the arc voltage and the voltage between said main and auxiliary brushes, and means responsive to the electrical condition of the arc for limiting the current through the motor armature when there is no current flowing in the welding circuit.

8. An arc welding system comprising a generator having main brushes, an auxiliary brush between which and one of the main brushes the voltage is substantially constant and lower than the arc voltage during welding, and a second auxiliary brush at a higher potential than the first auxiliary brush between which and the first auxiliary brush the voltage is substantially constant, a welding circuit connected to said main brushes, electrode feeding mechanism, a motor for operating said feeding mechanism, circuit controlling means for connecting the armature of said motor either between one side of the welding circuit and the first mentioned auxiliary brush or across the auxiliary brushes, and means responsive to the welding current for operating said circuit controlling means to connect said motor across the auxiliary brushes for operation in a direction to feed the electrode toward the work when there is no current in the welding circuit and to connect said motor between one side of the welding circuit and the first auxiliary brush when current flows in the welding circuit.

In witness whereof, I have hereunto set my hand this 22nd day of July, 1921.

PETER P. ALEXANDER.